W. W. CONNERS.
METHOD AND APPARATUS FOR INDICATING THE GEOGRAPHICAL LOCATION OR MOVEMENT OF BODIES.
APPLICATION FILED JUNE 12, 1919.

1,432,384.

Patented Oct. 17, 1922.

INVENTOR
Walter W Conners

W. W. CONNERS.
METHOD AND APPARATUS FOR INDICATING THE GEOGRAPHICAL LOCATION OR MOVEMENT OF BODIES.
APPLICATION FILED JUNE 12, 1919.

1,432,384.

Patented Oct. 17, 1922.

INVENTOR
Walter W Conner

Patented Oct. 17, 1922.

1,432,384

UNITED STATES PATENT OFFICE.

WALTER W. CONNERS, OF ELIZABETH, NEW JERSEY.

METHOD AND APPARATUS FOR INDICATING THE GEOGRAPHICAL LOCATION OR MOVEMENT OF BODIES.

Application filed June 12, 1919. Serial No. 303,753.

*To all whom it may concern:*

Be it known that I, WALTER W. CONNERS, a citizen of the United States, residing at Elizabeth, in the county of Union and State of New Jersey, have invented certain new and useful Improvements in Methods and Apparatus for Indicating the Geographical Location or Movement of Bodies, of which the following is a specification.

This invention relates to the transmission of intelligence of certain kinds by the use of waves propagated from one or more stations and received at one or more receiving stations without the use of tangible connecting means between such stations, being in its present form a species of electromagnetic wave communication.

More particularly the invention deals with a method and apparatus for the control of navigation by electromagnetic waves.

I am aware of the inventions of Hammond and others for controlling the movements of a vessel from a distant station but in all of the former devices such control was without the volition of those on board the vessel or other moving body and was further subjected to the disadvantages of a very limited range, extending but a few miles at most.

I am also aware that wireless instruments have been proposed such as the goniometer of Bellini and Tosi, but these are all inherently liable to error due to the necessity of employing magnetic compass aids and to the difficulty of estimating the true line to a sending station as such estimation, with such instruments, depends entirely on the capability of the observer to judge relative sound intensities.

It is to overcome the various objections to hitherto known methods that the present invention has been devised. To this end there are several important objects to be subserved by this invention all of which are of substantially equal importance irrespective of the order in which they are here set forth.

One of these objects is to provide an improved method of ascertaining, at a receiving station, the geographical direction of one or more sending stations so that the location of the receiving station may from time to time be ascertained or automatically indicated.

Another of these objects is to eliminate the necessity for the use of special antennæ at the receiving station, as for instance the Bellini and Tosi antennæ, this being accomplished by the improvement and simplification of the receiving apparatus to fit it for use with the standard antennæ with which most ships are equipped.

Moreover, it is well known that all apparatus of this general character is liable to be or become erroneously adjusted. A further object of the invention is to provide means to check the errors in indicating the location of the receiving station and its carrier by means of signals transmitted by apparatus outside of the receiving station, but electrically related thereto. A fourth object is to provide means for correcting the ascertained errors so that the indicating apparatus may give true geographical directions and positions.

It is also desirable in certain vehicles such as high speed vehicles such as airplanes that the time spent in calculating be eliminated and that all error due to individual mental discrepancies be eliminated. A fifth object of this invention is to automatically indicate visually or in similitude the location of the receiving station and the moving or stationary body or vehicle whereon it is located, this indication being given on board the body by means of apparatus located thereon and outside means electrically related thereto. As a corollary to this object a sixth object is to show automatically the speed and direction at which a vessel or the like is traveling in relation to the earth, and further to record the exact intervals of time between certain signals at the transmitting station.

The seventh object of the invention is to provide means whereby a course having been determined by those on board the vessel or elsewhere, or other vehicle carrying the receiving station and the apparatus adjusted thereto, the vessel will be automatically guided or steered over this predetermined course.

An eighth object of this invention is to provide means whereby certain functions such as closing an electric circuit or performing a mechanical movement for any desired result will be performed on board the vessel carrying the receiving station upon such a vessel reaching a predetermined spot or locality.

A ninth object of the invention is the provision of means whereby a moving body may automatically transmit signals to exterior places or stations which will intelligently indicate the position or location of the moving body.

A tenth object of the invention is the provision of apparatus so arranged that a sending station may effect alteration of the course and other functions of a body or vessel equipped with this apparatus so as to cause such body or vessel to perform any desired movement or function.

With the above and other objects in view, as will be hereinafter apparent, the invention consists in general of an improved method for determining locations by electromagnetic waves together with certain novel arrangements of apparatus for carrying the method into effect as hereinafter fully described, illustrated in the accompanying drawings and diagrams and specifically claimed.

In the accompanying drawings forming part of these specifications and illustrative of the invention like characters of reference indicate like parts in the several views, and:—

Fig. 3 is a diagrammatic view of a wiring arrangement at the receiving station as employed to receive waves from one sending station;

Figures 1, 2, 4, 5:
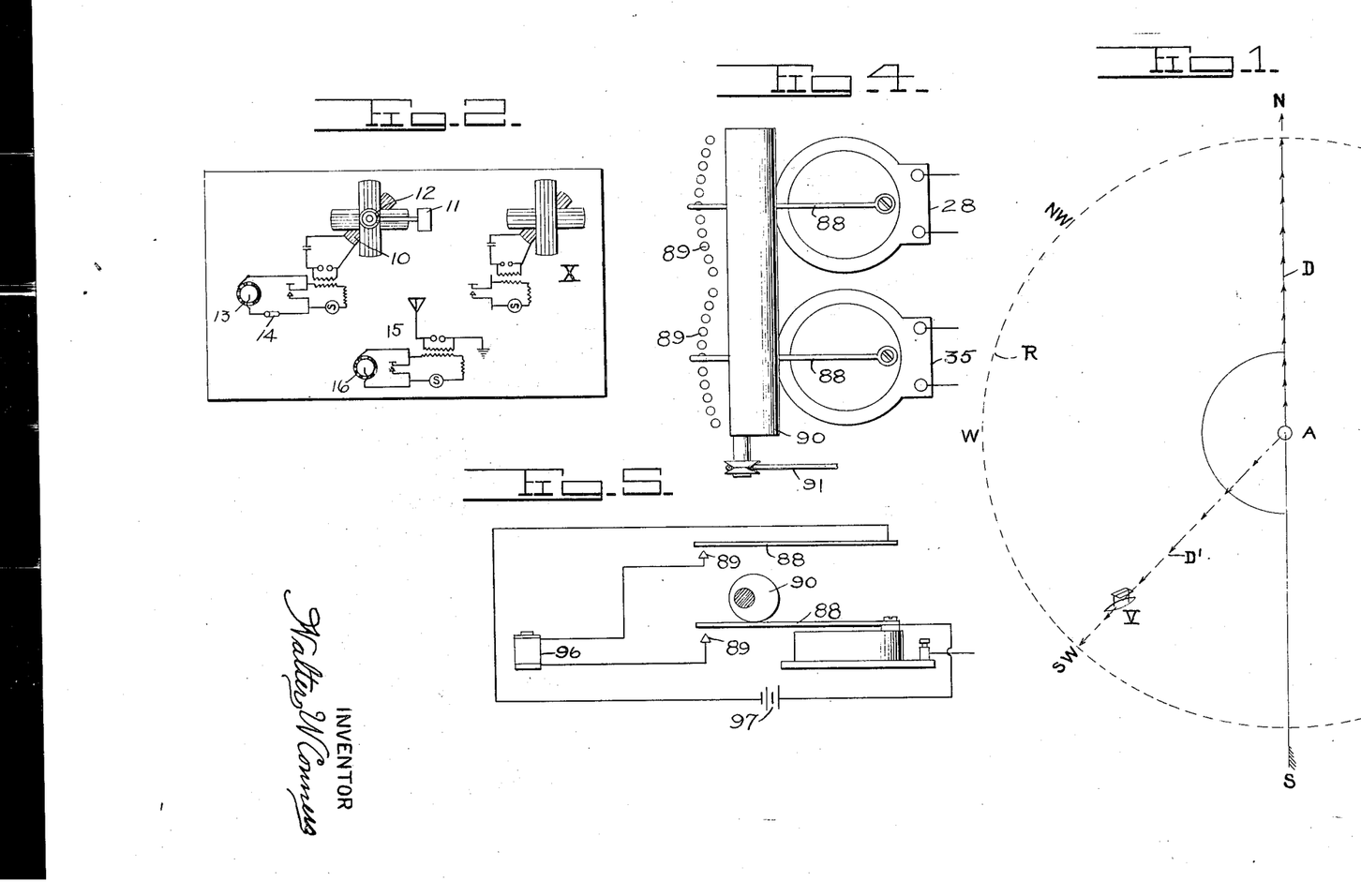
Fig. 1 is a schematic view illustrating the general operation of the invention.
Fig. 2 is a diagrammatic view typical of a sending station as it may be arranged for use in connection with this invention.
Fig. 4 is a plan view of the wattmeters and their adjacent parts shown conventionally.
Fig. 5 is a conventional side elevation of one of the wattmeters shown in Fig. 4, a connection diagram being also shown.

For the purpose of making clear the manner in which the device operates, irrespective of the mechanisms, wiring arrangements or circuits used to obtain the results desired, attention is first called to Fig. 1. In this figure there is shown a sending station A, which for the purposes of explanation may be considered as a light house or other fixed station. This sending station is equipped with any preferred means for sending out a uniformly radiating wave and at the same time is provided with additional means to emit a linear or directive wave or beam which is provided with means to cause its rotation preferably at uniform angular velocity, through a predetermined arc, as, for instance, the arc N—W—S. The apparatus is so arranged that the instant the rotating direction wave or beam D starts from its N (north) position towards W (west) the uniformly radiating wave is propagated in the usual circular form, as at R. It is preferred that the uniformly radiating wave and the directive wave have different characteristics so as to be distinguishable as well as capable of ready identification. For instance the two waves may be of different lengths as 600 and 1200 meters respectively.

At V is a second station, as for instance a ship on which it is desired to ascertain the bearing of station A and the relation of the ship with this bearing. This station is the receiving station and is equipped with suitable receiving apparatus (hereinafter explained) including means for determining the reception of each of said wave lengths.

Now, as above noted, as D starts to sweep over the arc N—W—S, the station V immediately receives and notes the time of reception of the uniformly radiating wave. The wave D continues to sweep over the arc at uniform angular velocity and in so doing crosses the station V (as shown by the dotted position D' of said wave). This wave is thus received at V and its time of reception noted. The wave D continues through the arc until it arrives at S whereupon the uniformly radiating wave is interrupted or stops, the time of such stoppage being noted at V. From the three times noted (or recorded by suitable apparatus) the elapsed time from starting to stopping of the uniformly radiating wave (say T) and the elapsed time from the starting of wave D to the instant of its crossing station V (say $t$) may be ascertained. Then from this we may obtain a ratio as follows $t:T::$arc N—W—SW: arc N—W—S::angle N—A—S: angle N—A—SW and we can thus ascertain the direction of station A from V.

Now having considered that with a single station A the direction of that station may be ascertained it follows, from the well known principles of trigonometry, that given two stations like A, the positions of which are known, directional lines may be drawn on a map or chart through these stations in the ascertained directions and the intersection of these lines will give the position of the receiving station. This is possible because all three angles of the triangle whose apices are the three stations can be ascertained by the foregoing method so that we have one side and two adjacent angles of a triangle to solve the remaining sides. It will be obvious that the solution thus obtainable presents a much less percentage of probable error than is possible by use of a goniometric receiver which only gives the insoluable condition of one side and its opposite angle being known and must be supplemented by compass courses to even afford an approximation.

Considering now the sending station. As previously noted this station is provided with apparatus for propagating a directed wave or beam which travels over a predetermined arc. This apparatus may, if desired assume the form shown in the U. S. patents to Bellini and Tosi Nos. 943,960 and 948,086, as indicated in Fig. 2 at 10. However, it is preferred to rotate the movable coil of this apparatus by some means which will afford uniform angular velocity to the emitted beam or wave. To this end clock work of ordinary description may be contained in a casing 11 and actuate the coil 10 through gears 12. Furthermore, it is desirable to cause the signals to be sent automatically and to accomplish this purpose a commutator 13 may be shunted across the key terminals of the primary circuit, a switch 14 being provided to cut out the commutator at will, and means being provided to drive the commutator in unison with the coil.

By properly arranging the commutator segments the primary circuit may be repeatedly made and broken as the commutator and coil revolve through the predetermined arc, the circuit being finally broken at the end of the arc and not again closed until the coil 10 reaches the position in which the wave or beam enters the arc.

Also at this station there is an ordinary sending apparatus 15, a second commutator 16 similar to the commutator 13 and driven in unison with it being used in the primary of this sending apparatus.

Thus at the instant the directive wave is started a uniformly radiating wave may also be started, both waves likewise may cease simultaneously.

The receiving station apparatus may be of various forms to accomplish the desired purpose but for the purpose of showing one such form the arrangement disclosed in Fig. 3 may be used, it being understood, however, that certain portions of the apparatus may require more powerful currents than those obtainable by the specific circuits disclosed; such stronger currents being readily obtained by the use of suitable relays or amplifiers which are here omitted for simplicity. Wherever, therefore, such relays or amplifiers are necessary they are to be understood as present.

The receiving station shown is provided with the antenna 16 which is connected to a switch or circuit closer 17 normally held against a contact 18 by a light spring 19. This contact 18 is variably connected to the primary 20 of a receiving tuner. Likewise there is provided a second contact 21 towards which the switch or circuit closer 17 may be drawn by the magnet 22 energized as hereinafter set forth. This contact 21 is variably connected to the primary 23 of a second receiving tuner. These two primaries are grounded in multiple at 24. Thus there is provided two open oscillation circuits.

The primary 20 inductively energizes the secondary 25 of the receiving tuner, this secondary having its terminals connected respectively to the grid G and negative terminal F of a three element valve or audion 26. At 27 is a battery which has its positive terminal connected to the plate P of the audion 26 while its negative terminal is connected through a wattmeter 28 to the negative end of the filament F. This wattmeter, it will be observed, takes the place of the usual telephone receivers. In addition, this secondary circuit is provided with a condenser 29 bridged across the terminals of the secondary coil and a second condenser 30 in series with the grid G. Both of these condensers are preferably of the variable type and around the condenser 30 is shunted the variable resistance 31' for the purpose of regulating the action of the wave train by controlling its effective action on the grid, the resistance acting as a leakage resistance for this purpose as well as to tend to cause the condenser to discharge slowly in one direction. At 31 is a filament battery whose terminals are connected to the respective terminals of the filament F, the positive terminal being connected through a variable resistance 32.

The remaining primary 23 inductively energizes a secondary circuit substantially identical with that just described, the circuit including a secondary 32', valve 33 (with filament F, grid G and plate P as usual), battery 34, wattmeter 35, condensers 36 and 37 and variable resistances 38 and 39. It is to be noted, however that the filament F of valve or audion 33 is connected to the battery 31 of the first secondary circuit, the purpose of this being to ensure a uniform supply of current to each filament whichever circuit may be receiving. This is essential as if the filament in valve 26 should be differently energized than the filament in valve 33 when the switch or circuit closer 17 is thrown then the two wattmeters would not give comparable indications.

So far the apparatus described has been for the purpose of receiving the uniformly radiating wave and to that end both sides are tuned to receive that wave, say to 600 meters wave length. Supposing both sides of the apparatus in tune and the switch 17 in its normal position closing the circuit through 20. So long as no wave train comes in over the antenna 16 (both filaments being equally energized) equal amounts of current will flow through and be registered by the respective wattmeters, provision being made to ensure true registration of these meters. If, now, the sending station sends out uniformly radiating waves of proper length (600 meters) they will be received by the antenna and the grid G which is at that time in circuit will become charged with a negative potential and the flow from the respective filament F to the respective plate P will be decreased or interrupted. By proper adjustment of the resistances 31' and 38 this charge may be made such as to definitely interrupt the circuit through the respective audion so that, with the circuit closed through the primary 20, the circuit through valve 26 will be interrupted and the wattmeter 28 will cease to register.

At the instant of starting the uniformly radiating wave the directive wave also starts and begins to sweep until it crosses the receiving station when, by means to be described later, the magnet 22 is energized and the circuit through primary 20 broken and that through primary 23 closed. The negative potential charge on the grid G of valve 26 disappears and current flows through that valve and the wattmeter 28. At this time the grid G in valve 33 receives a negative charge which at once stops the flow of current through that valve and its wattmeter 35. Thus there is obtained two interruptions of meter registration which are relatively equivalent to the arcs swept by the directive wave before reaching the receiving station and the arc swept by said wave after reaching the receiving station, these measurements being full equivalents for the purpose of the time intervals mentioned in the general discussion above. For instance by observing the wattmeter 35 we may find that flow through wattmeter 28 has been interrupted during a period wherein 45 units were registered in 35 and that registration in the latter is interrupted while 15 units are registered in 28. Thus we know that the two arcs are as 45 to 15 and if the entire arc swept by wave D is 180° then the angle N—A—SW equals 45/60 of 180° or 135°.

It now becomes necessary to understand the manner in which the passage of the directive wave causes energization of the magnet 22 and consequently closes the circuit through primary 23. To effect this purpose the antennæ 16 are connected to the tuning primary 40 of an amplifier which is grounded as at 41. The secondary coil 42 of this circuit has its terminals connected respectively to the grid G and negative terminal of a filament F of a valve or audion 43, inductive resistance 44 being interposed between the grid and secondary. A condenser 45 is bridged across the terminal connections and a second condenser 46 is connected in series in the connection between the secondary and filament. The filament is caused to glow by the current from a battery 47, the negative pole of this battery being connected directly to the negative side of the filament while the positive pole is connected to the filament through the variable resistance 48. At 49 is a battery which has its positive pole connected to the plate P of the audion, its negative pole being connected to the primary 50 of an induction coil, the secondary 51 of which is the secondary of a second amplifier circuit exactly similar to that now under consideration. The remaining terminal of the primary is connected to the filament F. Across the terminals of the primary 50 is bridged a variable condenser 52. At 52' is a battery which has its poles connected to a variable resistance 53', this resistance being variably connected to the connection between the secondary 42 and filament F and the battery being also variably connected to this connection, the two connections being on opposite sides of the condenser 46 so that the current passing through this connection may be regulated at will.

The second amplifier circuit being identical with the first it is not necessary to describe this circuit in all its details. However, attention should be given to the fact that this second circuit is provided with a primary coil 53 corresponding to the primary coil 50 of the first circuit and that telephonic receivers 54 across which is bridged a variable condenser 55 are supplied between the primary 53 and the filament, there being no condenser corresponding to the condenser 52 of the first circuit.

The device just described thus forms a cascade arrangement of amplifiers and it is obvious may be increased in intensity to any desired degree by the interposition of as many circuits like the first between that and the terminal (above referred to as the second) amplifier circuits.

Moreover, while the amplifying arrangement just described has been found well adapted to certain conditions yet it does not necessarily follow that this particular arrangement will be found useful or even advisable under other conditions. The arrangement is therefore only to be taken as illustrative of one of many ways in which the desired amplification may be obtained and not as restrictive to the peculiar form illustrated.

We now approach, however, a peculiar and characteristic arrangement which has been found especially adapted to the purposes of this device and that is the use of a coherer circuit as a local circuit relay at the end of the amplifying cascade. To this end there is provided a coherer 56 which is connected to the terminals of a secondary 57 in which current is induced by the primary 53. In addition to the coherer, magnet 22 and a local battery 58 are connected in series so that upon excitation of the coherer the local circuit is closed, the magnet 22 energized and the switch or circuit closer 17 moved to open the circuit through primary 20 and close that through primary 23.

In the operation of this part of the device the receiving tuner 40 is adjusted to receive waves of the length of those in the directive wave or beam (in this instance 1200 meters). Consequently the amplifying cascade will remain unaffected until the beam crosses the receiving station. At that instant currents are set up in the amplifying cascade which effect electrical conduction in the coherer and close the circuit of the magnet 22.

It is, of course, necessary to provide means for breaking this local circuit so that it will be open from the beginning of the operation cycle to the passage of the directive wave. To this end there is provided an armatured decoherer lever 59 normally urged out of contact with the coherer by a spring 60. A magnet 61 arranged to draw the lever or knocker 59 into contact with the coherer is connected in series in the circuit of the wattmeter 35. At the start of operations the magnet 22 is not energized, and the coil 57 will not be energized because the directive wave or beam will be out of alinement with the receiving station. It will be remembered that current flows through the wattmeter 35 until the beam or directive wave crosses the receiving station so that for this period the magnet 61 will be energized and remain energized. The decoherer lever will thus strike the coherer instantly upon close of the operation cycle. This breaks the circuit through the magnet 22 and permits the spring 19 to effect closing of the circuit through the primary 20 as required to produce stoppage of the current flow through wattmeter 28. Of course the decoherer lever will remain in contact with the coherer until the directive wave or beam crosses the receiving station but this will not affect the operation of the coherer adversely as the lever will rest quietly and not jar the coherer even when the directive wave operates to cause coherence. As before noted the crossing of the receiving station by the directive wave stops current flow through the wattmeter 35 and consequently through magnet 61 so that the spring 60 effects movement of the decoherer lever away from the coherer leaving the decoherer again ready to act upon starting of another operation cycle.

It is naturally possible that the apparatus which has been described may become inaccurate and thus give false indications. To enable inaccuracies to be checked and false indications corrected certain other means are provided. To this end the sending station is provided with a second directive wave apparatus typically indicated in general at X. This particular apparatus is preferably arranged to send a wave of markedly different characteristics from the other waves propagated from the sending station, as, for instance, a wave having a length of 2400 meters. Furthermore, this apparatus is so arranged and adjusted that the center of its wave or beam may be accurately positioned and held as long as desired in any required direction, proper means being established to the effect that the direction is a true and not a magnetic direction. Obviously this may be accomplished through the medium of astronomical observations. Means for accomplishing such directional adjustments are well known and it is in consequence, deemed unnecessary to detail the manner in which the result may be accomplished, it being sufficient that the sending station may send an accurately directed wave or beam having its maximum strength in a definite line.

At the receiving station there is provided an open oscillating circuit including the tuning primary 62 which is grounded at 63. This primary induces current in a secondary 64 which has its terminals connected to a detector 65 which may be a rectifying detector such as carborundum crystal detector. This circuit is provided with the usual variable condenser 66 bridged across the connections between the secondary and detector, and also with a condenser 67 in series in the usual connection. The telephone receivers 68 are connected on opposite sides of the condenser 67. By this means, the circuit being tuned to receive the accurately directed wave, the operator may determine approximately his position as the receiving station moves through this wave. It is not sufficient that an approximation be made, however, the exact center of this wave must be known in its relation to the swinging directive wave. To accomplish this there is provided a battery 69 which is connected in series to the telephone receivers 68 and to a pair of contacts 70 over which the switch 17 sweeps in its movement from the contact 18 to the contact 21. Thus at the instant the switch is operated by the directive wave a click will be heard in the telephone.

Connected in series with the primary 40 is a primary 71 which induces current in the secondary 72 of a receiving circuit which is here illustrated as provided with a rectifying detector 73. There is also provided the variable condenser 74 bridged across the secondary terminal connections and the condenser 75 in series in the usual terminal connection. Similarly the 2400 meter circuit is provided with a primary 76 inducing current in a circuit including the usual arrangement of secondary 77, rectifying detector 78, variable condenser 79 and series condenser 80. At 81 and 82 are the magnets of a polarized relay these magnets respectively having connections leading to opposite sides of the condensers 75 and 80. This relay is provided with a circuit closer 83 arranged to engage contacts 84 and 85 both being connected to one side of the telephone receivers 68 while the circuit closer is connected through a battery 86 to the other side of the receivers 68. In the connection to one of the contacts of the polarized relay, as the connection to contact 84, there is interposed a resistance 87 so that when the circuit is closed through this connection the click through the telephones will be clearly distinguishable from the click caused by closing the circuit through contact 85.

It is to be noted that the arrangement for operating the polarized relay may be supplemented by proper amplification means and even local circuits such as are shown in connection with the magnet 22 so that the circuits shown are to be taken as merely typical of any desired means for effecting operation of the polarized relay or current indicator. This apparatus effects immediate detection of any difference in direction of the swinging directive wave or beam and the accurately directed wave since if the centers of the two waves coincide the current entering the magnets from one direction will be opposed by an equal current in the opposite direction and the result will be that the relay will not operate to close a circuit through the battery 86. If the center of one wave (the point of greatest amplitude) reaches the receiving station before the other then the polarized relay will operate first to close one of the circuits through the battery 86 and then to close the other. For instance if the 1200 meter wave comes in first the magnet 81 will first be energized and then the magnet 82. This will close the circuit containing the resistance 87 and then the other circuit. Consequently there will be heard at the receivers 68 a relatively soft click followed by a relatively loud click. If the 2400 meter wave comes in first the clicks will be reversed, the loud click being followed by the soft click. Thus the variation from truth may be detected. It will be observed that in order to accomplish this effect it is necessary that the pilot of the airplane or other such moving body, when the accurately directed wave is received in its maximum intensity, cause the airplane to follow this wave for a short time so that the receiving station position, the swinging wave and the accurately directed wave are caused to be substantially coincident for this purpose.

To correct this variation it is simply necessary to adjust the variable condenser 55 which will regulate the piling up of the charge on that condenser and consequently its discharge which controls the effect of passage of current through the primary 53. This in turn effects regulation of the time of energization of the magnet 22 so as to cause operation of the switch 17 at the precise instant when the directive wave should cross the receiving station. It will be noted that, while not correcting the lack of synchronism in the two waves themselves, the effect on the receiving station apparatus will be precisely that as if the two waves were synchronous.

In addition a variable condenser 58' is connected between the coherer and secondary 57 so as to perform the double function of preventing flow of effective current through the magnet 22 by way of the secondary 57 and to regulate the action of the coherer. This condenser obviously is used in connection with the condenser 55 in the adjustment of the apparatus for true indications.

From the foregoing it will be seen that the receiving station apparatus is so arranged that the precise instant of the passage of the center of the directive wave or beam is registered by the stoppage of one wattmeter and starting of the other and can thus be used to determine exactly the direction of the sending station.

It will be obvious that other phases of each wave may be used to determine the variation from truth, it being only essential that the phase in one wave is compared with the corresponding phase in the other.

In order to provide a visual indication of the direction line certain apparatus termed a similitude box is employed in connection with circuits controlled by the wattmeters. For this purpose each of the wattmeters is provided with a swinging arm 88 which passes over a series of contacts 89. These two wattmeters are arranged side by side. Extending across the arms is a cam member 90 actuated by any suitable means, as by the belt 91. These wattmeters are so arranged that their arms are normally at the zero position, the arm of wattmeter 35 starting to move at the instant of receipt of the 600 meter wave and stopping at the instant of passage of the directive wave while the arm of wattmeter 28 starts only at the instant of the crossing of the directive wave and stops only at the cessation of the 600 meter wave. Thus one or the other of the wattmeter arms are moving the entire time the 600 meter wave is being received. In the similitude box 92 is an arcuate series of magnets 93 and carried by this box is an arm 94 provided with an armature 95 which is attracted by whichever magnet 93 may be energized, the arm being, of course, so pivotally supported as to swing under light magnetic torque. The two arms 88 are connected in series with a battery 97 and each magnet 93 is connected to one of the contacts 89 of each wattmeter, the manner of making the connections being shown in the diagrammatic view Fig. 7. From this view it will be noted that the movements of the arms 88 are in reverse directions in each wattmeter although this is not essential, simply being more conveniently illustrative. It will be noted in Figure 5 that the cam 90 is shown in position to depress one of the contacts 88. This cam of the wattmeter itself is left off of the other contact 88. in order to more clearly show the wiring direction but, as shown in Figure 4, the cam acts on both contacts 88 simultaneously. As an example of the operation suppose the directive beam to move through an arc of 135° before reaching the receiving station and 45° afterwards. Also, though the number of contacts and corresponding magnets will be very much larger in practice, suppose each wattmeter arm to be movable over twelve contacts 89 and that there are twelve magnets 93. Suppose also that the directive wave or beam has a total travel (angular) of 180° and travels 135° before crossing the receiving station. Under these circumstances the arm of wattmeter 35 will pass from contact 0 to contact 9 of its series of contacts 89 and will there stop. The arm of wattmeter 28 will now begin to move in the opposite direction from its contact 12 three points backward and will in like manner stop on contact 9 of that series. This is the operation for a single cycle, but inasmuch as the cycles are repeated continuously at short intervals, the positions assumed by the arms will be those caused by the average effects produced on the wattmeters by the action of the received signals. Thus the magnet 9 of the series of magnets 93 will be energized, and the arm or pointer of the similitude box will be moved to correspond with the direction of the directive wave or beam, since the simultaneous depression of both wattmeter arms when over corresponding contacts will establish a circuit through that magnet. It is plain that any other angular movement of the directive wave or beam before crossing the receiving station will eventually bring both wattmeter arms over corresponding contacts and that, until so correspondingly positioned, depression of the wattmeter arms will not effect closing of a magnet circuit. Restoring means (not shown) may be employed to bring the wattmeter arms to their starting points after the completion of the operation. It can be seen that the similitude arm will remain in position until another one of its controlling magnets is energized by some succeeding propagation of signal waves from the sending station whereupon the similitude arm will take a new position.

It is essential that the action of the wattmeters is such that their respective arms shall cover the full range of contacts if the circuits for the uniformly radiating wave are kept open during the full passage of that series of waves because if this were not so the arms would not be over corresponding contacts at the proper time. For instance, if there be twelve points to be swept over by each arm and the current received by the two wattmeters only effects movement over eight points when taken together then a movement of 135° in the foregoing example will only bring the arm of wattmeter 35 to point 6 and the arm of wattmeter 25 will lie on point 10 at the end of the cycle so that no effect will be produced in the similitude apparatus.

To ensure the foregoing results the wattmeters are each provided with a variable series resistance 98 and in a shunt around each meter there is a variable resistance 99. By adjusting these resistances the proper amount of current to effect travel of the arms correctly may be caused to flow through the respective wattmeters. It is obvious that on account of the slow action of the wattmeters a number of repetitions of the signals will be necessary in some instances so that the average cumulating effect will be obtained, the wattmeters being preferably indicating wattmeters.

Figure 6:
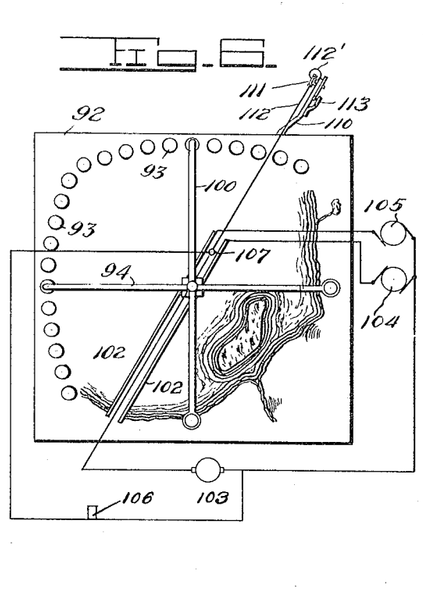
Fig. 6 is a plan view also showing a wiring diagram and illustrating the similitude box and certain connections.

The complete apparatus which has now been fully described only determines and indicates direction from one sending station. In order to ascertain position it is necessary to know and indicate the direction from a second station. To effect this a duplicate receiving apparatus is employed which is tuned to receive a second set of waves, say 900, 1800 and 3000 meters length respectively. This apparatus actuates a second similitude arm or pointer 100 pivoted on the similitude box in normal angular relation to the first arm or pointer Since each of these arms will show a direction corresponding to the respective sending station their intersection shows the position of the receiving station the pivotal points corresponding to the geographical location of the sending stations. For indicating the position of the ship a chart or map showing the field of movement of the receiving station in suitable scale and projection is fixed on the similitude box and thus the position of the receiving station can be read directly and without calculation by reference to the intersection of the two arms of the similitude box.

Figures 7, 8:
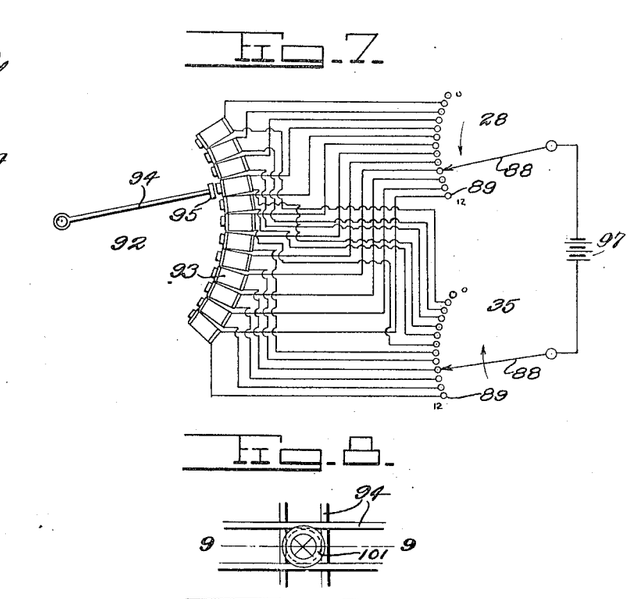
Fig. 7 is a wiring diagram showing typical connections between certain wattmeters and a similitude box as used herewith.
Fig. 8 is a plan of a slider arrangement suitable for use with the similitude box.
Figure 9:
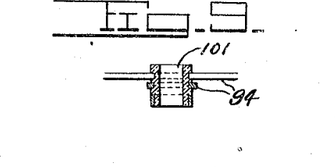
Fig. 9 is a section on the line 9—9 of Fig. 8.

Moreover, it is preferred to mount on the two similitude arms a slider 101. a suitable arrangement for this purpose being to slot the arms as shown in Figs. 8 and 9 and mount the slider in the slots, the slider itself being tubular and provided with cross hairs to indicate the intersection of the arms. Thus the position of the slider on the map becomes that of the receiving station.

In this connection automatic means may be provided for steering the vessel through the movement of the slider 101. To effect this a pair of parallel conductor strips 102 are placed on the map, the center between these strips being a route it is desired to be followed. At 103 is a source of motor current supply as a generator and connected in multiple to this source is a motor 104 for example, moving the vessel's rudder in one direction and a second motor 105 for moving the rudder in the opposite direction. Each of these motors is connected to a respective strip 102 and the slider 101, which is slightly less in diameter than the distance between the strips 102 is connected to the remaining pole of the generator. Since the strip center is the course to be followed and since the slider follows the actual course of the vessel any deviation from the course set will bring the slider into contact with one or the other of the strips 102 and in consequence will close a circuit through the respective rudder motor so that the course is corrected. Obviously the course may take any form desired, even returning to the starting point. Moreover, means may be provided to cause certain functions to be performed at the instant of the arrival of the vessel at a predetermined point, as for instance motive power may be shut off, a bomb may be dropped from an airplane, an explosion may be caused as on a ship sent into an enemy's fleet or harbor, a signal sent out giving the ship's location or other effects may be produced. To do this it is simply necessary to connect the source of energy, which may be the motor 103 in series with an electrically operated trigger mechanism (such as a fuse 106) and a contact plug 107 in the course of the slider so that contact between the slider and the contact plug effects closure of a circuit through the trigger mechanism.

It will be plain that the movement of the slider may be timed in its passage over the map either by observation or by utilizing a pair of contact plugs in two circuits with trigger mechanisms to start and stop a clock or other timing device.

Other fuctions may also be accomplished by this apparatus. For instance, the time of passage of the directive beam may be noted by suitable clock work (not shown) which can be started and stopped by magnets, such as 108, located in the wattmeter circuits. These magnets may also be used for other purposes as desired.

Figure 10:
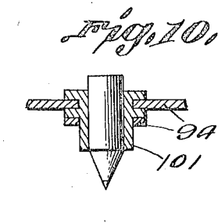
Figure 10 is a view of a modified slider employing a pencil or pointer.

Again the speed may be determined by special arrangements. For instance an arm 110 may be pivoted to the similitude box so as to carry a pulley 111 over which passes a cord 112 carrying a weight 112′ so that movement of the slider will rotate the wheel. This wheel may be connected to a gear train to operate a speedometer 113. Also the slider may be modified to carry a pen or pencil to actually draw the course over which the vessel passes directly on the map.

It will be also plain that, since the exact position of the receiving station is known the same may be signalled in the usual manner by apparatus to any desired station or position and that contact points may be employed to effect this automatically.

Furthermore, if desirable, magnets may be connected in series in the wattmeter circuits, which magnets may serve to operate trigger mechanisms controlling the starting and stopping of a clock so as to record the exact time interval between the recepit of the 600 meter wave and the receipt of the 1200 meter wave so that, if the time of movement of the directive beam is known this time interval may be used as a check on the wattmeter readings. Also, if a sending station is located upon a vessel or other moving body and a pair of receiving stations on other vessels or bodies or in a fixed position the location of the receiving station being known the sending station may transmit intelligent signals to the receiving stations which signals will locate the first vessel or body.

Since the direction in which the vessel carrying the receiving station moves is controlled by the waves from the sending station any alteration of the manner of sending these waves will affect the course of the vessel so that by properly altering the time of starting the uniformly radiating wave or making other like alterations the course of the vessel may be changed at will. This is especially useful in cases where the automatic steering means is employed to steer a vessel without a crew, as for instance an aerial torpedo.

In the foregoing description it has been assumed throughout that the uniformly radiating wave was intermittent, but this wave may be sent constantly if desired, it being merely necessary to cause certain signals to be sent from the transmitting station at predetermined positions (say the north and south positions by way of example) of the directive wave or beam.

What I claim is:

1. That method of determining directions by waves propogated from a station, which consists in sending from the station a directive wave rotatingly directed over a predetermined arc, starting a uniformly radiating wave at the beginning of the movement of the first wave over the arc, stopping the second wave at the completion of the movement of the first wave over the arc, receiving the second wave at a second station during its period of transmission and noting the interval elapsing between the starting and stopping of said second wave in suitable units, receiving the first wave at the second station at the instant of its passage across said second station and noting the interval elapsing between the starting of the second wave and the passage of the first in the aforementioned units, deducing the ratio between the predetermined arc and the arc covered by the first wave to the instant of its reception at the second station from said intervals and thereby determining the angle between the beginning of the predetermined arc and the straight line passing through the two stations.

2. The combination with a sending station having means for propagating a directive wave and rotating the same over a predetermined arc, other means for propagating a uniformly radiating wave, and means to control the starting and stopping of the uniform wave when the directive wave is is predetermined position; of a receiving station in the path swept by the directive wave and provided with means controlled by electric energy received from the sending station for automatically determining the relationship between the arc swept by the directive wave before reaching the receiving station and the remainder of the entire arc swept by said directive wave.

3. The combination with a sending station having means for propagating a directive wave and rotating the same through a predetermined arc, other means for propagating a uniformly radiating wave, and means to control the starting and stopping of the uniform wave simultaneously with the entry and exit of the directive wave into and from the arc; of a receiving station provided with a recording instrument and means to effect stoppage and starting of said recording instrument controlled by the action of the uniformly radiating wave and the passage of the directive wave across the receiving station.

4. The combination with a sending station having means for propagating a directive wave and rotating the same through a predetermined arc, other means for propagating a uniformly radiating wave, and means to control the uniformly radiating wave whereby to effect starting of the uniformly radiating wave and stoppage of the same simultaneously with the beginning and end of movement of the directive wave through the arc; of a receiving station including a pair of meters and means governed by the starting of the uniformly radiating wave to stop one of said meters while permitting registration by the second, and other means governed by the action of the directive wave in crossing the receiving station to stop the second meter and permit the first to register.

5. The combination with a sending station having means for propagating a directive wave and causing the same to rotate through a predetermined arc, other means for propagating a uniformly radiating wave, and means to control the uniformly radiating wave whereby to effect starting of the uniformly radiating wave, and stoppage of the same simultaneously with the beginning and end of movement of the directive wave through the arc; of a receiving station provided with the usual antenna and having a pair of open oscillating circuit primaries receptive of the uniformly radiating wave and selectively connectable to said antenna, one of said primary circuits being normally open and the other being normally closed; closed oscillating circuits inductively connected to said open oscillating circuits and each provided with a valve, registering means for each closed circuit and batteries each connected in series with a respective registering means through the valve of a respective open oscillating circuit, means normally connecting the antenna with one of said primaries, and other means responsive to the action of the directive wave and arranged to actuate the last mentioned means and cause opening of the closed primary connection and closing of the open primary connection.

6. The combination with a sending station having means for propagating a directive wave and causing the same to rotate through a predetermined arc, other means for propagating a uniformly radiating wave, and means to control the uniformly radiating wave whereby to effect starting of the uniformly radiating wave and stoppage of the same simultaneously with the beginning and end of movement of the directive wave through the arc; of a receiving station provided with the usual antenna and having a pair of open oscillating circuit primaries receptive of the uniformly radiating wave and selectively connectable to said antenna, closed oscillating circuits inductively connected to said open oscillating circuits and each provided with a valve, registering means for each closed circuit and a battery connected in series therewith through the respective valve, a third open oscillating circuit primary receptive of the directive wave, an amplifying circuit inductively connected to the third primary, a switch for effecting selective connection of the antenna with the first two primaries, and magnetic means including a relay inductively connected to the amplifying circuit for moving the switch to break connection with one of the first two primaries and close connection with the other.

7. The combination with a sending station having means for propagating a directive wave and causing the same to rotate through a predetermined arc, other means for propagating a uniformly radiating wave, and means to control the uniformly radiating wave whereby to effect starting of the uniformly radiating wave and stoppage of the same simultaneously with the beginning and end of movement of the directive wave through the arc; of a receiving station provided with the usual antenna and having a pair of open oscillating circuit primaries receptive of the uniformly radiating wave, closed oscillating circuits inductively connected to said open oscillating circuits and each provided with a valve, registering means for each closed circuit and a battery connected in series therewith through the respective valve, means normally connecting the antenna with one of said primaries, and other means responsive to the action of the directive wave and arranged to actuate the last mentioned means and cause opening of the closed primary connection, and closing of the open primary connection, a third open oscillating circuit primary receptive of the directive wave, an amplifying circuit inductively connected to the third primary, a switch for effecting selective connection of the antenna with the first two primaries, a circuit including a battery, a coherer and a magnet, the latter being arranged to actuate the switch to break connection with one of the first two primaries and close connection with the other, and a closed oscillating circuit in inductive connection with the amplifying circuit and arranged to effect closure of the coherer circuit by operating the coherer.

8. The combination with a sending station having means for propagating a directive wave and causing the same to rotate through a predetermined arc, other means for propagating a uniformly radiating wave, and means to control the uniformly radiating wave whereby to effect starting of the uniformly radiating wave and stoppage of the same simultaneously with the beginning and end of movement of the directive wave through the arc; of a receiving station provided with the usual antenna and having a pair of open oscillating circuit primaries receptive of the uniformly radiating wave, closed oscillating circuits inductively connected to said open oscillating circuits and each provided with a valve, registering means for each closed circuit and a battery connected in series therewith through the respective valve, means normally connecting the antenna with one of said primaries, and other means responsive to the action of the directive wave and arranged to actuate the last mentioned means and cause opening of the closed primary connection, and closing of the open primary connection, a third open oscillating circuit primary receptive of the directive wave, an amplifying circuit inductively connected to the third primary, a switch for effecting selective connection of the antenna with the first two primaries, a circuit including a battery, a coherer and a magnet, the latter being arranged to actuate the switch to break connection with one of the first two primaries and close connection with the other, a closed oscillating circuit in inductive connection with the amplifying circuit and arranged to effect closure of the coherer circuit by operating the coherer, a decoherer in operative relation to the coherer, a spring for restoring the switch to its initial position, and means to effectively operate the coherer operable upon termination of the uniformly radiating wave.

9. The combination with a sending station having means for propagating a directive wave and rotating the same through a predetermined arc, other means for propagating a uniformly radiating wave, means to control the uniformly radiating wave whereby to effect starting of the uniformly radiating wave and stoppage of the same with the beginning and end of movement of the directive wave through its arc, and other means for propagating a second directive wave in a predetermined fixed direction; of a receiving station provided with means for determining the relationship between the arc swept by the directive wave before reaching the receiving station and the remainder of the entire arc swept by said directive wave, and with means for detecting lack of synchronism between the two directive waves when apparently in the same position.

10. The combination with a sending station having means for propagating a directive wave and rotating the same through a predetermined arc, other means for propagating a uniformly radiating wave, means to control the uniformly radiating wave whereby to effect starting of the uniformly radiating wave and stoppage of the same with the beginning and end of movement of the directive wave through its arc, and other means for propagating a second directive wave in a predetermined fixed direction; of a receiving station including a pair of meters, means governed by the starting of the uniformly radiating wave to effect stopping of one of the meters while permitting registration by the second meter, other means governed by the action of the first directive wave in crossing the receiving station to stop the second meter and permit the first to register and further means governed by the receipt of the second directive wave to detect error in the effective action of the first directive wave.

11. The combination with a sending station having means for propagating a directive wave and rotating the same through a predetermined arc, other means for propagating a uniformly radiating wave, means to control the uniformly radiating wave whereby to effect starting of the uniformly radiating wave and stoppage of the same with the beginning and end of movement of the directive wave through its arc, and other means for propagating a second directive wave in a predetermined fixed direction; of a receiving station provided with the usual antenna and having a pair of open oscillating circuit primaries receptive of the uniformly radiating wave, closed oscillating circuits inductively connected to said open oscillating circuits and each provided with a valve, registering means for each closed circuit and a battery connected in series therewith through the respective valve, means normally connecting the antenna with one of said primaries, other means responsive to the action of the first directive wave and arranged to actuate the last mentioned means and cause opening of the closed primary connection and closing of the open primary connection, a third open oscillating circuit primary receptive of the first directive wave, a fourth open oscillating circuit primary receptive of the second directive wave, and means controlled by the third and fourth primaries for detecting asynchronism of the two directive waves.

12. The combination with a sending station having means for propagating a directive wave and rotating the same through a predetermined arc, other means for propagating a uniformly radiating wave, means to control the uniformly radiating wave whereby to effect starting of the uniformly radiating wave and stoppage of the same with the beginning and end of movement of the directive wave through its arc, and other means for propagating a second directive wave in a predetermined fixed direction; of a receiving station provided with the usual antenna and having a pair of open oscillating circuit primaries receptive of the uniformly radiating wave, closed oscillating circuits inductively connected to said open oscillating circuits and each provided with a valve, registering means for each closed circuit and a battery connected in series therewith through the respective valve, means normally connecting the antenna with one of said primaries; a third open oscillating circuit primary receptive of the first directive wave, an amplifying circuit connected inductively to the third primary, a switch for effecting selective connection of the antennæ with the first two primaries, magnetic means including a relay inductively connected to the amplifying circuit for moving the switch to break connection with the first primary and make connection with the second primary, a fourth open oscillating circuit primary receptive of the first directive wave, a fifth open oscillating primary receptive of the second directive wave, means controlled by the fourth and fifth primaries for detecting asynchronism in the two directive waves, and means associated with the amplifier and relay circuits affording adjustment of the relay action whereby to cause effective synchronism in the action of said directive waves.

13. In apparatus for representing in similitude the location and movement of a body, a chart or representation of the field of movement of the body located on the body, means to indicate upon said chart or representation the position of said body, and means responsive to signals transmitted to said body to move said indicating means in accordance with the movements of the body.

14. In apparatus for representing in similitude the location of a body, a chart or representation of the field of movement thereof located on the body, means to indicate upon said chart or representation the position of the body, and means responsive to signals transmitted to said body to move said indicating means in accordance with the movements of the body.

15. In apparatus for representing in miniature the location of a moving body, a chart or representation of the field of movement thereof carried by said body, a pointer to indicate upon said chart the direction of said body relative to an outside point, and radiodynamic means to move said pointer in accordance with the movements of said moving body.

16. In apparatus for indicating visually the position of a moving body with respect to an exterior point, a chart or representation of the field of movement of the body carried by said body, a pointer mounted to travel across said chart or representation, operating means for said pointer on the body responsive to radiant energy transmitted to said body from said point, and an electric circuit operatively associated with said pointer, and responsive means for causing movement of the pointer.

17. In apparatus for indicating visually the position of a moving body with respect to an exterior point, a chart or representation of the field of movement of the body carried by said body, a pointer mounted to travel across said chart or representation, operating means for said pointer responsive to radiant energy transmitted to said body from said point, a slider movable along said pointer, and means to move said slider in accordance with the movements of the body.

18. In apparatus for representing in similitude the location and movement of a body, a chart or representation of the field of movement of the body, means to indicate upon said chart or representation the position of said body, and means responsive to signals transmitted to said body to move said indicating means in accordance with the movements of the body; in combination with means associated with said chart and governed by the movement of the indicating means thereover to control the movement of the body.

19. In apparatus for representing in similitude the location of a body, a chart or representation of the field of movement thereof, means to indicate upon said chart or representation the position of said body, means responsive to signals transmitted to said body to move said indicating means in accordance with the movements of the body; in combination with means associated with said chart and governed by the movement of the indicating means thereover to control the movement of the body.

20. In apparatus for indicating visually the position of a moving body with respect to an exterior point, a chart or representation of the field of movement of the body carried by said body, a pointer mounted to travel across said chart or representation, a slider movable along said pointer, and means responsive to radiant energy transmitted to said body from said point and arranged to move said slider in accordance with the movements of the body; in combination with means associated with said chart and governed by the movement of the slider thereover to control the movement of the body.

21. In apparatus for representing in similitude the location and movement of a body, a chart or representation of the field of movement of the body, means to indicate upon said chart or representation the position of said body, and means responsive to signals transmitted to said body to move said indicating means in accordance with the movements of the body; in combination with a controlling device operated in accordance with said indicating means.

22. In apparatus for representing in similitude the location of a body, a chart or representation of the field or movement thereof, means to indicate upon said chart or representation the position of the body, and means responsive to signals transmitted to said body to move said indicating means in accordance with the movements of the body; in combination with a controlling device operated by said indicating means when at a predetermined point.

23. In apparatus for indicating visually the position of a moving body with respect to an exterior point, a chart or representation of the field of movement of the body carried by said body, a pointer mounted to travel across said chart or representation, a slider movable along said pointer, and means responsive to radiant energy transmitted to said body from said point and arranged to move said slider in accordance with the movements of the body; in combination with a controlling device operated by said indicating means when at a predetermined point.

24. In apparatus for representing in similitude the location and movement of a body, a chart or representation of the field of movement of the body, means to indicate upon said chart or representation the position of said body, and means responsive to signals transmitted to said body to move said indicating means in accordance with the movements of the body; in combination with means associated with said chart and governed by the movement of the indicating means thereover to cause the body to follow a predetermined path and to operate a controlling device when at a predetermined point in its path.

25. In apparatus for representing in similitude the location of a body, a chart or representation of the field of movement thereof, means to indicate upon said chart or representation the position of the body, and means responsive to signals transmitted to said body to move said indicating means in accordance with the movements of the body; in combination with means associated with said chart and governed by the movement of the indicating means thereover to cause the body to follow a predetermined path and perform a predetermined function at a predetermined point in its path.

26. In apparatus for indicating visually the position of a moving body with respect to an exterior point, a chart or representation of the field of movement of the body carried by said body, a pointer mounted to travel across said chart or representation, a slider movable along said pointer, and means responsive to radiant energy transmitted to said body from said point and arranged to move said slider in accordance with the movements of the body; in combination with means associated with the chart and governed by the movement of the slider to cause the body to follow a predetermined path and perform a predetermined function at a predetermined point in its path.

27. In apparatus for representing in similitude the location and movement of a body, a chart or representation of the field of movement of the body, means to indicate upon said chart or representation the position of said body, and means responsive to signals transmitted to said body to move said indicating means in accordance with the movements of the body; in combination with means associated with the position indicating means to indicate the speed of the body.

28. In apparatus for representing in similitude the location of a body, a chart or representation of the field of movement thereof, means to indicate upon said chart or representation the position of the body, and means responsive to signals transmitted to said body to move said indicating means in accordance with the movements of the body; in combination with means associated with the position indicating means to indicate the speed of the body.

29. In apparatus for indicating visually the position of a moving body with respect to an exterior point, a chart or representation of the field of movement of the body carried by said body, means responsive to radiant energy transmitted to said body from said point, a pointer mounted to travel across said chart or representation, a slider movable along said pointer, and means to move said slider in accordance with the movements of the body; in combination with means associated with the slider to indicate the speed of the body.

30. In apparatus for indicating visually the position of a moving body with respect to an exterior point, a sending station having means for propagating directed waves and rotating waves over a predetermined arc, other means for propagating a uniformly radiating wave, and controlling means to effect indications of the start and finish of the sweeping movement of the directed wave over said arc and provided with means for automatically determining the relationship between the arc swept by the directed wave before reaching the receiving station and the remainder of the entire arc swept by said directed wave; and of means at the sending station for varying the action of the controlling means and thereby varying the indication at the receiving station.

31. The combination with a sending station having means for propagating a directive wave and rotating the same over a predetermined arc, and means for propagating signals on the entry in and exit from the arc of said wave; of a receiving station in the path swept by the directive wave and provided with means to determine the entry in and exit from the arc of said wave and to automatically determine the passage of the wave across the receiving station.

32. In apparatus for indicating visually the position of a moving body with respect to an exterior point, a chart or representation of the field of movement of the body carried by said body, means responsive to radiant energy transmitted to said body from said point, a pointer mounted to travel across said chart or representation, a slider movable along said pointer, and a marker carried by the slider and arranged to trace the movements of the slider on the chart.

In testimony whereof I affix my signature.

WALTER W. CONNERS.